United States Patent [19]

Holdsworth et al.

[11] 4,277,022
[45] Jul. 7, 1981

[54] MOBILE MATERIAL DISTRIBUTION SYSTEM

[75] Inventors: Dennis W. Holdsworth, 33 Old Farm Rd., Dover, Mass. 02030; Ernst Adler, Chestnut Hill, Mass.

[73] Assignee: Dennis W. Holdsworth, Dover, Mass.

[21] Appl. No.: 969,469

[22] Filed: Dec. 14, 1978

Related U.S. Application Data

[63] Continuation of Ser. No. 788,891, Apr. 19, 1977, abandoned.

[51] Int. Cl.³ .................... G01F 1/05; A01C 17/00
[52] U.S. Cl. ........................... 239/7; 239/677; 239/156; 222/55
[58] Field of Search ................ 239/676, 677, 156, 7; 222/55

[56] References Cited

U.S. PATENT DOCUMENTS

| | | | |
|---|---|---|---|
| 2,047,203 | 7/1936 | Henson | 222/55 X |
| 2,872,074 | 2/1959 | Birtwell et al. | 222/55 |
| 3,677,540 | 7/1972 | Weiss | 239/677 |
| 3,782,634 | 1/1974 | Herman | 239/156 |
| 4,052,003 | 10/1977 | Steffen | 239/170 X |
| 4,058,012 | 11/1977 | Gauch | 222/55 X |
| 4,093,107 | 6/1978 | Allman et al. | 239/156 X |

Primary Examiner—Robert W. Saifer
Attorney, Agent, or Firm—Charles E. Pfund

[57] ABSTRACT

Apparatus for controlling the delivery of material from a moving vehicle using a "closed loop" feedback control. The error signal to close the loop is derived from a continuous measurement of the actual rate of mass flow of material compared to the desired or computed rate of mass flow for a range of vehicle speeds. The vehicle speed is measured and used to modify the desired rate of mass flow in order to achieve a controlled mass per unit area of ground surface.

31 Claims, 8 Drawing Figures

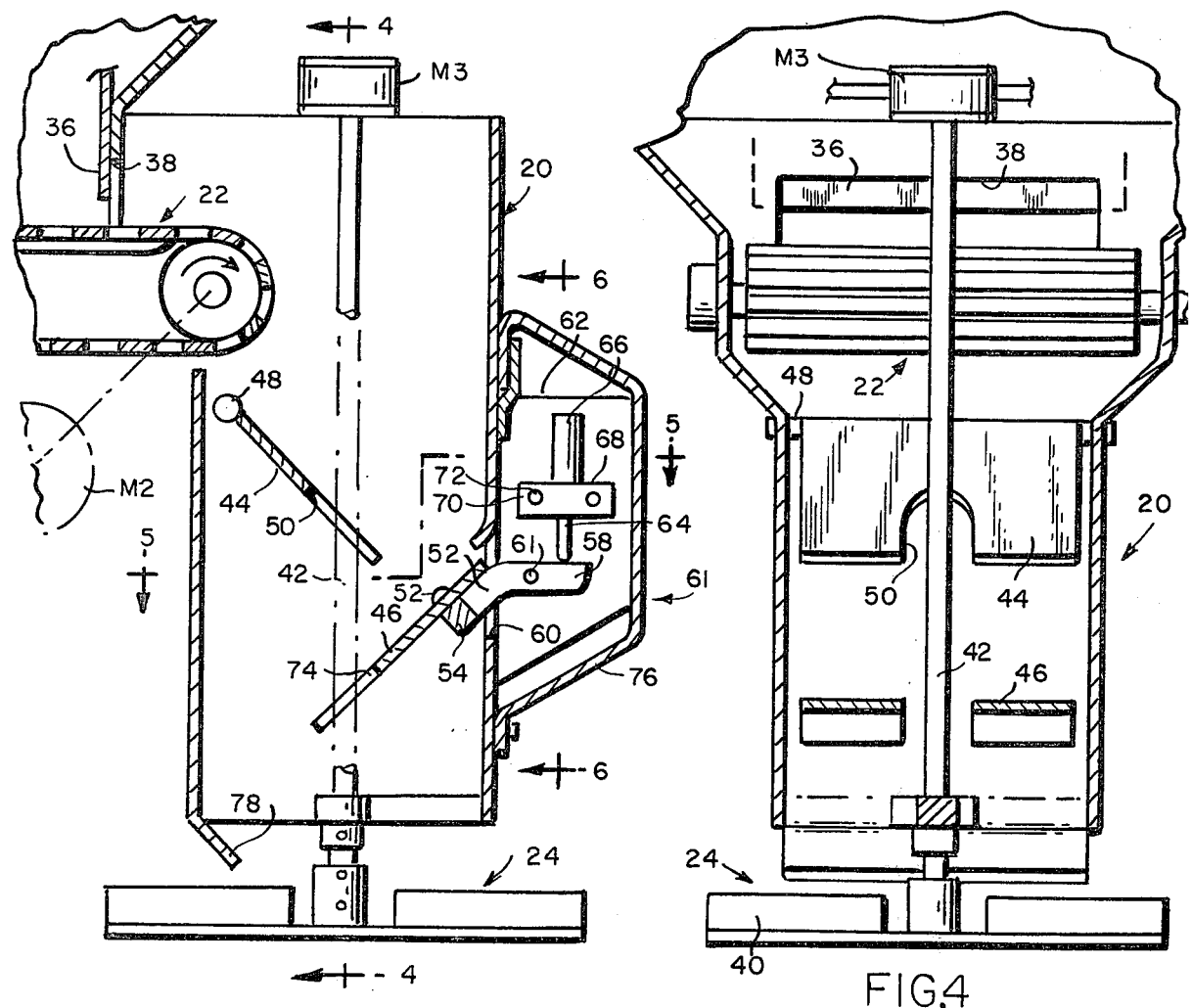
FIG.3
FIG.4
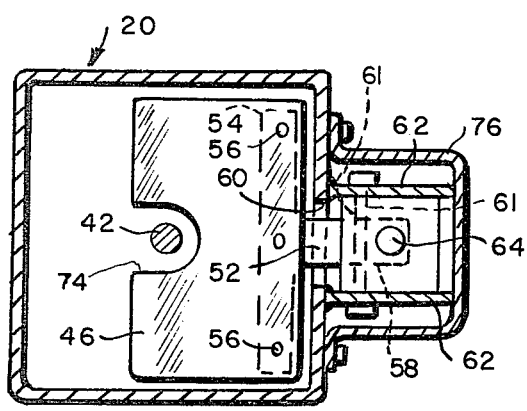
FIG.5
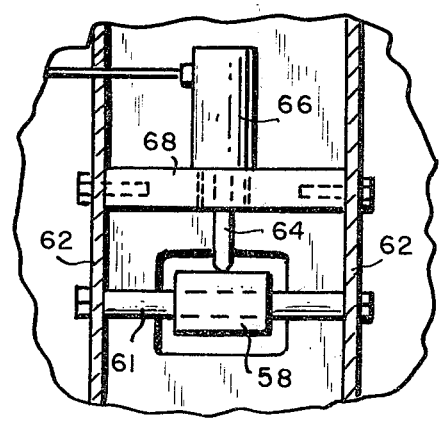
FIG.6

MOBILE MATERIAL DISTRIBUTION SYSTEM

This is a continuation of application Ser. No. 788,891, filed Apr. 19, 1977, and now abandoned.

BACKGROUND OF THE INVENTION

The apparatus disclosed herein is specifically designed to spread a mass of sand and/or salt on highways, airport runways and the like; however, it is to be understood that it may be used for spreading fertilizer and other material over areas other than paved surfaces. Such apparatus is not new as is evidenced by U.S. Pat. Nos. to Stewart 2,256,655; Wild 3,744,993; Hallsey 3,232,626; Swenson 3,550,866; Weiss 3,677,540; Heinz 3,756,509; Santer 2,660,439 and 3,768,737. The apparatus shown in the foregoing patents operates to effect uniform distribution by increasing the speed of the conveyor by means of which the material is delivered to the distributor in proportion to any increase in the ground speed of the vehicle. The effectiveness of such apparatus depends upon the conveyor delivering a constant predetermined volume of material. As a practicing matter, the conveyor will not always deliver the same mass for a given speed of the conveyor due to the fact it is a volume system, also the material may cake in the hopper and not flow freely onto the conveyor due to the fact that obstructions such as frozen chunks of salt and sand and/or rocks may hold back the material on the conveyor, so the conveyor will not deliver the required amount of material. Such a system is an "open loop" control since no error signal is derived from the actual material being handled. It is the purpose of this invention to provide a "closed loop" apparatus for delivering a selected mass of material per unit of target area to be covered in spite of such obstructions in the delivery of material to the distributor. Yet other objects are to provide for driver selections of mass to be distributed per unit area, overriding control by means of which the operator may arbitrarily increase the rate of flow to meet an extraordinary ground condition, visual and audible signals to indicate to the driver the failure of flow or depletion and an indicator of the total weight of material distributed at any given time.

SUMMARY OF THE INVENTION

As herein illustrated, the apparatus comprises in combination with a power-driven vehicle a distributor, a conveyor such as an endless belt on which may be an auger of the Archimedean screw variety for delivering material to the distributor, means situated between the conveyor and the distributor for moving the mass of material delivered from the conveyor to the distributor and producing a signal proportional thereto, means for measuring the ground speed of the vehicle and for producing a signal proportionally thereto, means for comparing the signals and means responsive to the compared signals to change the speed of the conveyor so as to compensate for changes in the ground speed of the vehicle. The means between the conveyor and distributor for measuring the mass of material delivered by the conveyor to the distributor comprises an inclined deflector plate supported adjacent the conveyor with its upper end at the delivery end of the conveyor, and an inclined sensor pivotally supported in an inclined position adjacent the lower end of the deflector plate in a position such that the lower end of the deflector plate gravitationally delivers the material onto the sensing plate adjacent the pivot axis thereof, said sensing member being inclined in the opposite direction from the direction of inclination of the deflector. The deflector plate and sensor are inclined at approximately 45 degrees. The effect of the deflector plate, in addition to directing the flow of material to the correct part of the sensor plate, is to nullify the effect of impact forces on the rate of mass flow measurement, since, for different sizes of machines, the height of free fall from the conveyor to the sensor will vary considerably. There is a hopper for holding a quantity of material and the conveyor is supported below the hopper with its receiving end in a position to gravitationally receive material from the hopper. There is a vertically disposed discharge chamber supported with its upper end adjacent the hopper and its lower end adjacent the distributor. The chamber contains at its upper end a side wall opening through which the discharge end of the conveyor extends by means of which the material withdrawn from the hopper is delivered into the upper end of the chamber. The deflector plate and sensor are situated within the chamber below the discharge end of the conveyor and are inclined in opposite directions. There is manually operable means for increasing or decreasing the mass per unit area at any predetermined rate of ground speed of the vehicle, means for nullifying signals of short duration due to sudden acceleration or deceleration of the vehicle and/or temporary obstructions in the feed from the conveyor and means for effecting a temporary increase or decrease in the feed rate to provide for extraordinary conditions. Signal lights and audible warnings are also provided to indicate such conditions as failure of the feed due to obstructions and a depleted hopper. The apparatus provides for controlling the delivery of material from a moving vehicle using a "closed loop" feedback control. The error signal to close the loop is derived from a continuous measurement of the actual rate of mass flow of material compared to the desired or computed rate of mass flow for a range of vehicle speeds. The vehicle speed is measured and used to modify the desired rate of mass flow in order to achieve a controlled mass per unit area of ground surface.

The invention will now be described in greater detail with reference to the accompanying drawings, wherein:

FIG. 3 is a vertical fragmentary section showing a portion of the conveyor, the deflector plate, the sensing plate and the distributor;

FIG. 4 is a view corresponding to a section taken at right angles on line 3—3 of FIG. 3;

FIG. 5 is a horizontal section taken on the line 5—5 of FIG. 3;

FIG. 6 is a vertical section taken on the line 6—6 of FIG. 3;

Figure 1:
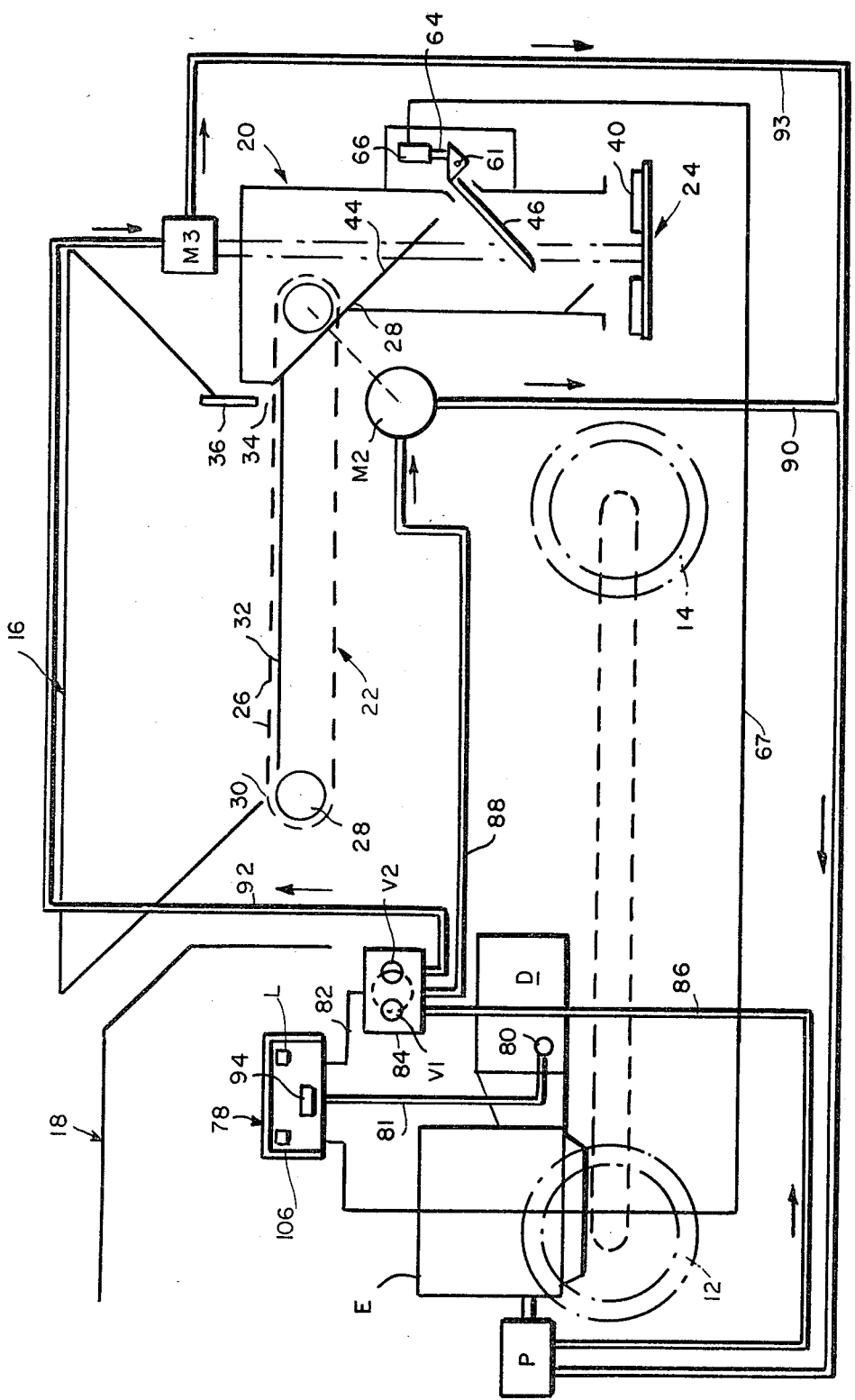
FIG. 1 is an elevation diagrammatically illustrating the apparatus.
Figure 2:
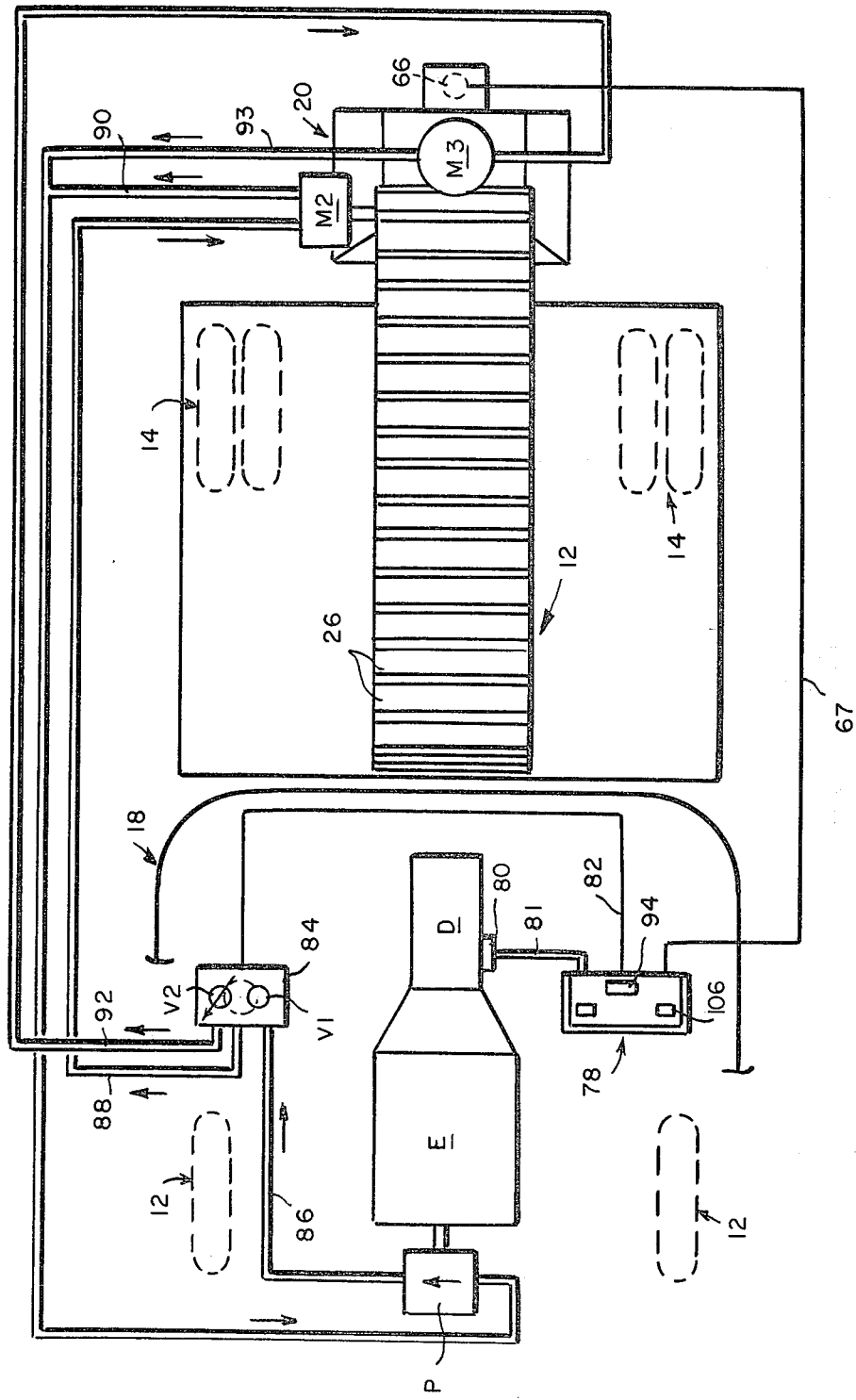
FIG. 2 is a diagrammatic plan view of FIG. 1.

Referring to the drawings, FIGS. 1 and 2, there is diagrammatically illustrated in elevation and plan view a motor-driven vehicle comprising a chassis 10, front and rear wheels 12 and 14 and a power plant in the form of a motor E. A wide-mouthed hopper 16 is mounted on the chassis rearwardly of the cab 18 and rearwardly of the hopper there is a vertically disposed chamber 20 of substantially rectangular horizontal section to which the material to be spread is delivered by a conveyor 22 underlying the hopper. At the lower end of the chamber 20, there is a distributor 24 onto which the material is deposited.

The conveyor 22 is an endless belt, comprised of spaced, parallel slats 26, entrained about longitudinally spaced, parallel rollers 28—28, one of which is driven by a motor M2 or an auger screw feed as before mentioned. The upper run of the belt enters the left-hand end of the hopper as shown in FIG. 1 through a slot 30, travels along the bottom 32 of the hopper and leaves the hopper through an opening 34 at the right-hand end of the hopper. The vertical height of the opening 34 is preset by means of a doctor blade 36. In the case of the auger screw feed, the exit orifice is fixed and only the feed rate can be controlled.

The chamber 20, FIGS. 3 and 4, has near its upper end an opening 38 through which extends the delivery end of the conveyor belt 22 so that rotation of the belt carries the material from the bottom of the hopper into the upper end of the chamber 20 where it is discharged and falls gravitationally downwardly within the chamber 20 toward the distributor 24.

The distributor 24 is in the form of a flat disk, having on its upper surface radially disposed vanes 40 FIGS. 3 and 4, secured to the lower end of a shaft 42, the latter being rotatably supported in suitable bearings within the chamber 20 at the geometrical center thereof. A motor M3 connected to the shaft 42 provides for rotating the distributor.

In accordance with this invention, there is provided in the chamber 20, FIGS. 1, 3 and 4, an inclined deflector plate 44 and an inclined sensor plate 46. The inclined deflector plate 44 as shown in FIGS. 3 and 4 is fixed at its upper end to a bar 48 just below the inwardly projecting end of the conveyor belt with its lower end projecting downwardly toward the opposite wall at an angle of approximately 45 degrees. The lower portion of the deflector plate 44 contains an opening 50 for receiving the shaft 42. The sensor plate 46 is mounted below the deflector plate at the opposite side of the chamber from the deflector plate on a bracket member generally designated 52 having a part 54 located within the chamber to which the sensor plate is secured by fastening means 56 and a part 58 which extends through an opening 60 in the wall of the chamber and is pivotally supported by a shaft 61, the ends of which are fixed in space by parallel, vertically disposed bracket plates 62—62 at the outer side of the chamber. The sensor plate 46 is normally supported at an inclination of substantially 45 degrees by a vertically disposed plunger element 64 which protrudes from the lower end of a hydraulic cylinder 66 supported for adjustment laterally with respect to the part 58 of the bracket 52 by a plate 68 containing slots 70—70 for receiving bolts 72—72 by means of which it is fastened to one of the plates 62. The lower end of the sensor plate 46 contains an opening 74 for receiving the shaft 42. Desirably, the outwardly protruding part 58 of the bracket, the plunger 64 and hydraulic cylinder 66 are enclosed within a housing member 76 attached to the outer side of the chamber 20. It is to be understood that this is only one type of transducer which can be operated by the part 58. The transducer used preferably senses force without appreciable deflection. The objective is to measure the pressure due to the mass of material sliding down the plate without producing appreciable deflection of the plate, since this will produce an error in measurement proportional to tangent theta $\theta$ which must be corrected.

The deflector plate 44 and sensor plate 46 are dimensioned so as to extend the full width of the chamber, that is, from side-to-side as shown in FIG. 4, and to overlap to such an extent that the lower end of the deflector plate 44 is closely adjacent the upper end of the sensor plate 46 and the lower end of the sensor plate 46 terminates substantially at the center of the chamber.

The material which is to be distributed by the apparatus, as related above, is delivered through the side wall opening 38 at the top of the chamber 20 and falls freely onto the upper sloping surface of the deflector plate 44 whereupon it slides downwardly thereon onto the oppositely inclined, upwardly facing surface of the sensor plate 46. Because of the arrangement of the plates 44 and 46, the material sliding down from the deflector plate 44 onto the sensor plate 46 is deposited on the sensing plate quite close to the axis of the shaft 61 which is the pivot axis on which the sensor plate is pivotally supported and so without substantial pivoting torque due to impact. Following deposit on the sensor plate 46, the material slides downwardly thereon and gravitationally falls onto the upper side of the distributor 24. In order to redirect any of the material which is projected beyond the lower end of the sensor plate 46, there is provided at the bottom of the chamber a reversely inclined apron 78.

Figure 7:
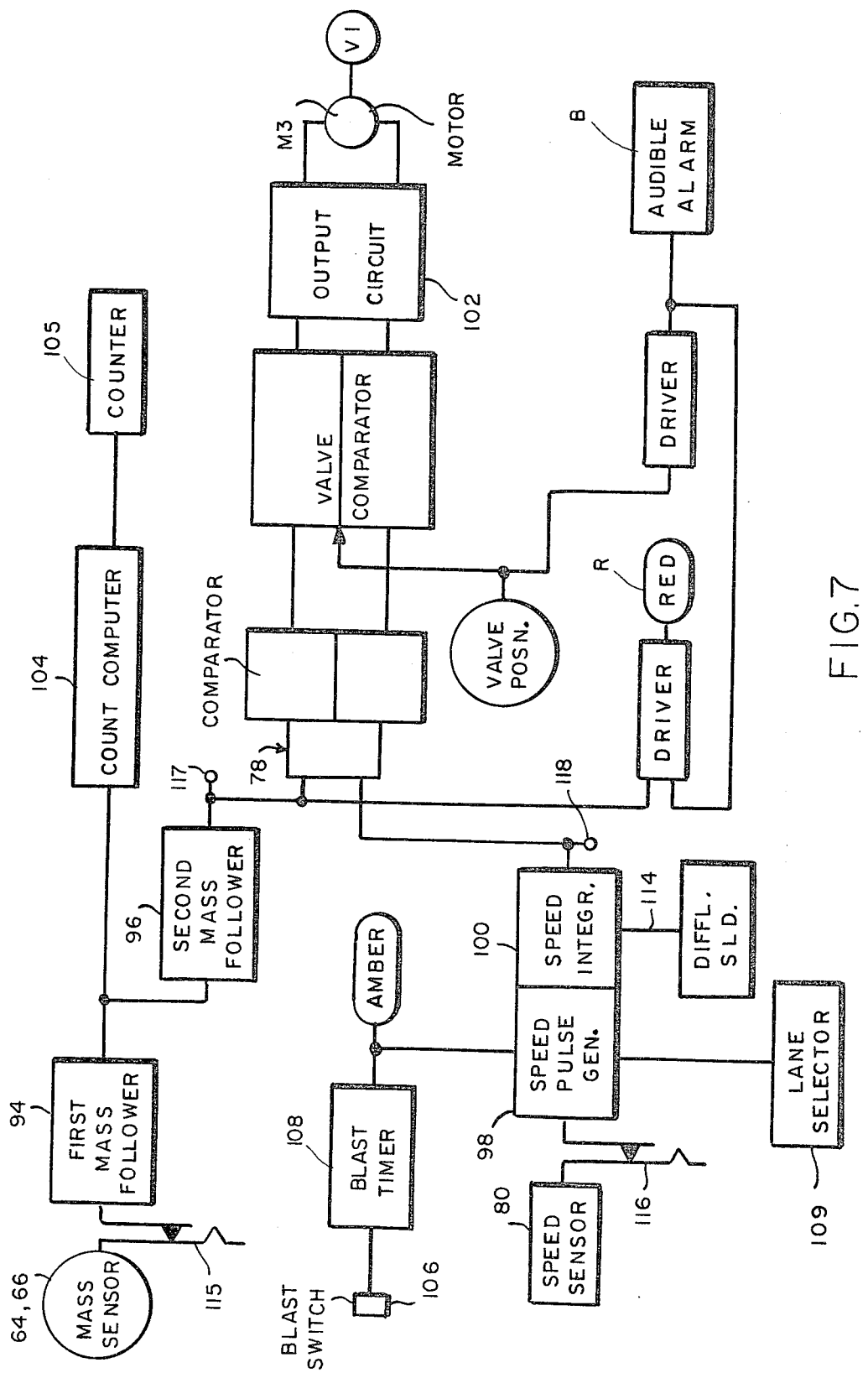
FIG. 7 is a block diagram of the control means.

The plunger 64 and hydraulic cylinder 66 constitute one form of sensing means which is operative by pivotal means of the sensor plate 46 in response to the weight of the mass deposited thereon to send a signal by way of a conductor 67 FIG. 1 proportionate to the mass on the sensing plate at any given time to a comparator unit 78, FIGS. 1, 2 and 7. Since, as related above, the material is deposited close to the pivot axis of the sensor plate, the effect of the impact forces is substantially nullified so that the sensor device will only reflect changes in mass.

The purpose of the apparatus is to deliver a selected mass of material per unit area at whatever ground speed the vehicle is traveling. Accordingly, the rate of delivery of the material to the distributor must be modified with changes in the ground speed of the vehicle. As related, heretofore this has been achieved by correlating the speed of the conveyor with that of the vehicle, but, as also pointed out, this was predicated on the assumption that there would be a uniform, uninterrupted flow of material from the hopper onto the conveyor and from the conveyor to the distributor. This is not the fact for, even though the conveyor may be moving at a predetermined speed, caking of the material in the hopper may be such that it does not flow uniformly from the hopper onto the conveyor, or chunks of frozen salt and sand and/or rocks may become lodged against the doctor blade so that the entire width of the conveyor is not discharging into the chamber. Consequently, such control is not effective. The control provided herein eliminates the defects of such prior apparatus in that the mass is measured at its place of delivery to the distributor by the sensor plate 46 so that if the mass at the sensor plate 46 changes from what has been determined as desirable per unit of area, a signal will be sent thereby to either increase or decrease the rate of movement of the conveyor to either supply more or less material as required. To achieve this, there is provided speed-sensing means 80, FIGS. 1, 2 and 7, which is driven from the drive train D or a vehicle wheel. The speed-sensing means 80 is connected by a cable 81 to the comparator 78 so as to generate signals which are proportional to the speed of the vehicle. The two signals, the one from the sensing device 64,66 and the one from the speed-sensing means 80, are combined at the comparator 78 to produce an error signal. The signal from the comparator is transmitted as an electric current through a conductor 82 to a valve housing 84 containing valves V1 and V2. The valve V1 is connected by a supply pipe 86 to a hydraulic pump P which is driven by the engine E and by a supply pipe 88 to the hydraulic motor M2 which drives the conveyor belt. A return pipe 90 connects the hydraulic motor M2 to the hydraulic pump P. The valve V2 is connected by a supply pipe 92 to the hydraulic motor M3 which drives the distributor and this valve V2 may be manually adjusted to increase or decrease the rate of flow to the hydraulic motor M3 and, hence, to increase or decrease the speed of rotation of the distributor. A return pipe 93 connects the hydraulic motor M3 with the pump P.

The comparator 78 is mounted in the cab, together with the control panel on which there is mounted an ON/OFF switch 94 for starting the system in operation or shutting it down. The panel also has on it a blast switch 106 for increasing the rate of delivery of the material for a short period of time to take care of unusual conditions, a lane selector 109 and switch L for selecting the number of lanes, and visual and audio signals for indicating failure of delivery of the material, depletion of the supply in the hopper and a total distributed weight indicator.

A block diagram of the control is shown in FIG. 7 and, as indicated therein, signals from the mass and speed-sensing means 64, 66 and 80 are, respectively, preprocessed in first and second mass followers 94, 96 and a speed pulse generator 98 and integrator 100, whereupon they are combined in the comparator circuits 78. The latter, via output circuit 102, actuates the electric gear motor M3 so as to change the hydraulic fluid flow to the conveyor drive motor M3 (and therefore conveyor speed and material flow). Mass information is also applied to a count computer 104 so that the material distributed may be totalized in counter 105.

In the absence of mass flow, a red light R is illuminated. This condition is to be expected when the vehicle is at rest.

When the vehicle is in motion and either (a) the hopper is empty or (b) a blockage is impeding the correct mass flow, the valve V1 will open fully to try to correct this situation. The full open condition in the valve V1 is indicated by the intermittent tones of an audible alarm B. When the valve V1 is in a fully open condition and there is no mass flow, the red light R will flash at the same rate as the alarm B.

Certain conditions require increased spreading rate for a short time. For this purpose, there is provided a push button operator actuate blast switch 106 and timer 108. Momentary depression of the push button will initiate the timer 108 for a period, for example, of 10 seconds during which the spreading rate is increased by 50 percent (for example). continuous depression of the push button will maintain the increased spread rate and delay the onset of the 10 second period unti it is released. An amber signal light A denotes the increased spread rate condition.

Adjustment of the preset spread rate (normally 300 pounds per lane mile) for different road widths is selected for two, three or four lanes by means of a lane selector switch L.

The means illustrated in FIGS. 1 to 7 inclusive for sensing the mass is a hydraulically-operated bourdon gauge; however, it is within the scope of the invention to employ other kinds of sensing means such as a servo system, a resistance system or a hydraulic valve system.

Figure 8:
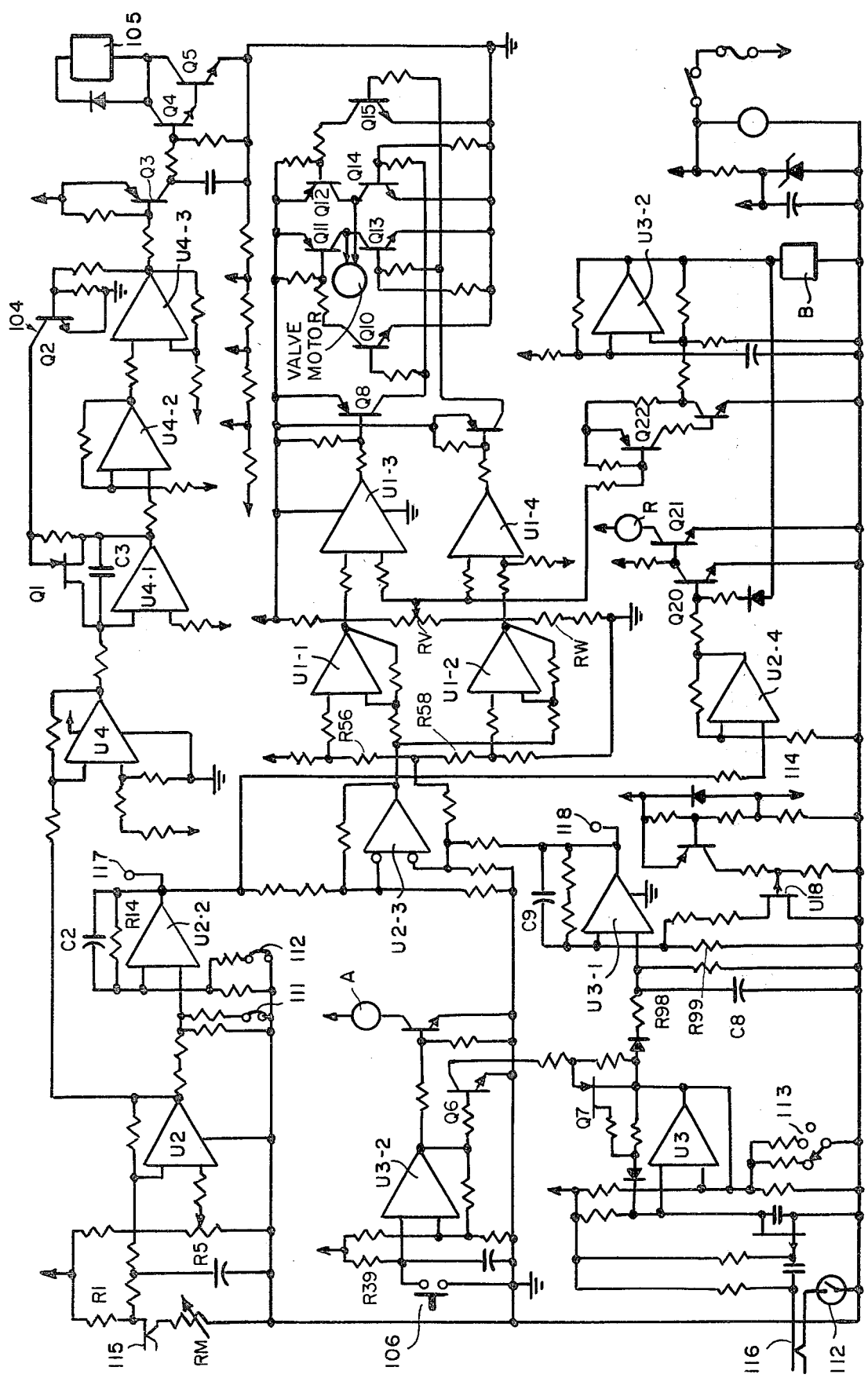
FIG. 8 is a schematic wiring diagram of the control means of FIG. 7.

Referring now to FIG. 8, the control means will be described in further detail. Hydraulic sensing means 64,66 operates to vary a pressure sensitive variable resistor Rm which decreases in resistance as the mass on sensor plate 46 increases. This resistance variation in the voltage divider circuit $R_1$, $R_m$ applies a voltage signal representing mass flow rate to operational amplifier U2 which has an adjustable voltage from potentiometer R5 applied to set the output voltage to zero at zero mass flow rate on sensor plate 46. The output of U2 is applied to a unity gain op amp U2-2 having RC feedback via capacitor C2 and resistor R14 to smooth out short rapid mass signal fluctuations. Op amp U2-2 has accessible jumpers 111, 112 which can be replaced by resistors to calibrate the actual mass flow to the magnitude of the mass flow signal and signal variation. Thus delivery rates for the material distributed by the system other than the previously described 300 lbs/lane mile can be selected.

The output of U2 is also applied to the count computer 104 which is comprised of op amps U4, U4-1, U4-2, U4-3. U4 references the zero mass flow rate signal to V/2, half the supply voltage, and has a gain of $\frac{1}{3}$. U4-1 is an integrator having an integration feedback capacitor C3 which is shunted by an FET switch Q1. U4-2 has a gain of 3 for the integrated signal and applies its output to voltage comparator U4-3 which is referenced to a voltage such that it toggles, i.e., produces a comparison output, each time the integrator U4-1 has accumulated a signal representing distribution of a predetermined mass of material, for example, 10 lbs. A comparison output from U4-3 operates through transistor Q2 to make Q1 conduct thereby resetting integration capacitor C3 to zero and thus returning the output of comparator U4-3 to logic zero. The comparison pulse from U4-3 also is applied to transistor Q3 which has a pulse stretching coupling circuit driving a Darlington pair Q4, Q5 which registers the pulse as a counter in the counter 105 preferably calibrated in weight of material distributed.

A speed sensor 112 connected to the vehicle drive train is arranged to produce a predetermined number of switch closures or other pulse actuations per road mile. In the present system the switch 112 is arranged to produce 6,000 pulses per road mile. Hence at 30 mph there are $30 \times (12,000)/(60 \times 60) = 100$ pulses per second.

The pulses produced by road speed are standardized in op amp U3 and applied to an integration circuit associated with op amp U3-1 having capacitor C8 on the input thereof and feedback capacitor C9. The pulses which are so applied are standardized in width by op amp U3 and the width is adjustable by means of selector switch 113. The resistors introduced and removed by selector switch 113 are calibrated as part of a voltage divider input to the reference input terminal of U3 to correspond to 2, 3 and 4 lane widths of the road. Thus the control 113 is available in the cab for the driver of the vehicle to select whether he is spreading material on two lane of the road or whether he is covering 3 or 4 lanes. Similarly, the feedback ratio of op amp U3-1 can be modified by FET switch U18 in response to a signal on solenoid line 114 which feature is utilized in vehicles equipped with variable ratio differentials in response to operation of gear change to modify the scaling function of op amp U3-1 to correspond to the different road miles covered for particularly selected gear ratio in the differential. Thus the output signal from integrator C8, R98, R99 applied to U3-1 is proportional to road speed and can be compensated for both selected travel lanes or road widths to be covered and for the gear differential ratio of the drive train.

The pulse width which is integrated to obtain a voltage proportional to road speed can be overridden by actuation of FET switch Q17 in response to closure of blast switch 106 which is available in the cab. Closure of switch 106 grounds an input to op amp U3-2, the output of which is applied through transistor Q6 to make Q17 non-conductive. Upon release of blast switch 106 the timing circuit comprising resistor R-39 and capacitor C5 at the input of U3-2, maintains switch Q17 non-conductive for predetermined time while capacitor C5 recharges. Thus a momentary closure of blast switch 106 provides a predetermined timing of additional material flow and holding switch 106 depressed maintains the increased rate of material distribution for as long as it is depressed. As previously described during operation with blast switch conditions for high mass material flow, amber indicating light A in the cab is energized to indicate such condition.

The combining of the mass delivery signal and the road speed signal is accomplished in op amp U2. The signal from the second mass follower U2-2 is applied as one input to op amp U2-3 and the other input is supplied as the road speed signal from op am U3-1. For standard road speed and standard mass delivery these signals balance and the output of op amp U2-3 is logic zero. The output of U2-3 is applied to opposite polarity inputs of a voltage comparator U1-1, U1-2, which are op amps biased at their other inputs to be non-conductive over a suitable deadband interval provided by voltage divider resistors R56, R58. Thus for logic zero signal from U2-3 the comparator op amps U1-1 and U1-2 both have logic zero outputs and because of the opposite polarity connection for the input signals thereto, only one of the op amps U1-1 or U1-2 will become conductive at any given time. Thus if the polarity of the signal output from U2-3 relative to logic zero changes in one direction one of the comparator op amps will produce a logic 1 output and if the signal changes in the other direction the other comparator op amp will produce a logic 1 output. The outputs of the comparator op amps U1-1 and U1-2 are applied respectively to a valve position comparator comprising op amps U1-3 and U1-4. The other inputs to comparators U1-3 and U1-4 are derived from a potentiometer RV which represents the position of control valve V1, in FIG. 7. Thus a logic 1 input to op amp U1-3 will drive control valve V1 toward the open position and the movement of valve V1 actuates the potentiometer RV toward its end point. The output signals from the valve comparator op amps U1-3 and U1-4 are applied to balanced pairs of transistors Q11, Q12, Q13 and Q14 via coupling and drive transistors Q8, Q9, Q10 and Q15 which are connected to operate as a reversing switch for the drive motor controlling the valve and valve potentiometer RV. Thus the valve will be adjusted to control material mass delivery by controlling the speed of operation of the conveyor 26 driven by motor M2 with motor speed M2 being either increased or decreased as long as there is a signal unbalance output from signal combiner U2-3 greater than the deadband interval for comparators U1-1 and U1-2. Once the actuation of the valves and the corresponding change in the mass flow delivery achieves the desired mass delivery per road mile, the circuit operates to reduce the output of signal comparator U2-3 to within the deadband of comparators U1-1 and U1-2 and the valve position remains as set until further changes in operating conditions, either road speed or material delivery from the conveyor to the mass sensor 46 occurs. Similarly, movement toward closure of valve V1 is controlled by op amp U1-4. To prevent continued operation of valve motor M4 when valve V1 is fully open, an end stop position of potentiometer RV supplies a voltage signal to op amp U1-3 to make its output logic zero. To prevent any delivery of material at zero road speed, potentiometer RV has a bottom end stop position, selected by trimmer RW, to exactly close valve V1 at zero road speed condition by means of op amp U1-4.

The operation of the foregoing circuit is believed to be clear from the description and will be appreciated to comprise a fully closed loop servo control of the delivery of material to establish a predetermined mass flow rate per unit area which is covered by the vehicle carrying the apparatus. Thus variations in read speed, lane widths, gear train ratio and partial blockage of the delivery passage of the material or other mass variations from the source of supply are all automatically compensated to achieve the desired end of a predetermined mass delivery per unit area covered by the vehicle. Thus the most rigid control to achieve the predetermined delivery rates is automatically accomplished together with various controls, indications and override conditions.

The output signals from the second mass follower U2-2 is also applied to an op amp U2-4, the output of which is connected through a drive transistor Q20, 21 to operate the red indicator lamp R. As previously described, illumination of lamp R indicates loss of mass delivery signal from the signal channel originating with mass sensor Rm and indicates either that there is complete blockage from the conveyor or that the hopper supply has been totally depleted.

The movement of the control valve V1 to its fully open (maximum material demand) limit position with the corresponding movement of potentiometer RV to its limit position provides a signal applied to transistor Q22 which is scaled and applied as an enabling input to op amp U3-2 connected as an astable multivibrator to actuate an audible alarm B intermittently as previously described. The signal which actuates the alarm B is also applied to transistor Q20 to energize the visual red indicator R if it is indicating zero flow rate. Thus loss of mass flow or the condition of end of travel for the adjustment of valve V1 produces visual or audible indications or both.

Special test instruments can be arranged to enable the system to be operated (wholly or in part) without actually moving the vehicle in which it is mounted and/or without actually discharging material. For this purpose special switch/connector jacks 115, 116 are provided which enable speed and/or mass flow rate signals to be injected into the system from the test instruments. Similarly, critical output signals can be measured and displayed at test points 117, 118. For example, a speed signal could be applied at jack 116 as a pulse generator of suitable pulse repetition rate. A mass flow rate signal can be simulated by a rheostat variable resistance to ground inserted at jack 115.

I claim:

1. Apparatus for controlling delivery of particulate material from a vehicle at a rate proportional to the speed of the vehicle to maintain a selected mass per unit area comprising a distributor, means for delivering particulate material to the distributor along a predetermined path, means in said path responsive to the rate of mass flow of particulate material moving along said path to produce a signal proportional to the mass flow rate of particulate material, means for producing a signal proportional to the ground speed of the vehicle, means for comparing the signals and means responsive to the output of the last-named means to change the speed of the means for delivering the mass to the distributor so as to effect a uniform distribution of particulate material per unit area independently of the ground speed of the vehicle.

2. Apparatus according to claim 1 comprising operator-controlled means for selecting the mass per unit area to be distributed.

3. Apparatus according to claim 1 comprising operator-controlled means for changing the speed of movement of the means for delivering material independently of the ground speed of the vehicle.

4. Apparatus according to claim 1 comprising means for nullifying rapid fluctuations in the signals from the mass and road speed sensing means.

5. Apparatus according to claim 1 comprising operator-controlled means for initialing a change in the feed rate independently of the ground speed of the vehicle.

6. Apparatus according to claim 5 comprising a timer for restoring the feed rate to its initial feed rate.

7. Apparatus for controlling the delivery of particulate material from a vehicle at a rate proportional to the ground speed of the vehicle to thus maintain a constant mass per unit of area comprising a distributor, a conveyor for delivering particulate material to the distributor, means situated between the conveyor and the distributor for measuring the rate of mass flow of particulate material delivered from the conveyor to the distributor and producing a signal proportional thereto, means for measuring the ground speed of the vehicle and producing a signal proportional thereto, means for comparing the signals and means responsive to said compared signals to change the speed of the conveyor so as to compensate for changes in the ground speed of the vehicle.

8. Apparatus for controlling the delivery of material from a vehicle at a rate proportional to the ground speed of the vehicle to thus maintain a constant mass per unit area comprising a distributor, a conveyor for delivering the material to the distributor, means situated between the conveyor and the distributor for measuring the rate of mass flow of material delivered by the conveyor to the distributor and producing a signal proportional thereto, said means comprising an inclined deflector plate supported adjacent the conveyor with its upper end at the delivery end of the conveyor, an inclined sensing plate supported on a pivot axis in an inclined position adjacent the lower end of the deflector plate in a position such that the lower end of the deflector plate gravitationally delivers material onto the sensing plate adjacent the said pivot axis thereof, said sensing plate being inclined in an opposite direction to the direction of inclination of the deflector plate with its lower end directly above the distributor, sensing means operable to produce a signal proportional to the mass of material sliding downwardly on said sensing plate to the distributor, means for producing a signal proportional to the ground speed of the vehicle, means for comparing the two signals and means responsive to the output of said last means for changing the speed of the conveyor so as to compensate for changes in the ground speed of the vehicle.

9. Apparatus according to claim 8 wherein said deflector plate and sensing plate are inclined at opposite angles of approximately 45 degrees to the horizontal.

10. Apparatus according to claim 8 wherein the means situated between the conveyor and distributor is a sensor and wherein a closed loop feedback control system is employed wherein said sensor closes the loop.

11. Apparatus for controlling the delivery of material from a vehicle at a rate proportional to the speed of the vehicle to thus maintain delivery at a selected mass per unit of area comprising a distributor, a hopper for holding a quantity of material, a conveyor supported with its receiving end below the hopper, an inclined deflector supported with its upper and adjacent the discharge end of the conveyor, an inclined sensor pivotally supported adjacent the lower end of the deflector in a position such that the material sliding down the deflector is deposited onto the sensor substantially at the pivot axis, said sensor being inclined in the direction opposite that of the deflector and being supported with its lower end directly above the distributor, means operable by the sensor in response to a predetermined rate of mass flow to produce a predetermined signal, means operable by the speed of the vehicle to produce a signal, a motor for driving the conveyor and a comparator operable in response to both said signals to change the speed of the motor to increase the speed of the conveyor with an increase in the speed of the vehicle and to decrease the speed of the conveyor with a decrease in the speed of the vehicle.

12. Apparatus according to claim 11 wherein there is a vertically disposed chamber supported above the distributor with its lower end substantially concentric with the distributor and with its upper end adjacent the hopper, said chamber containing a side wall opening through which projects the discharge end of the conveyor and wherein the deflector and sensor are located within the chamber, one above the other, and extending downwardly in opposite directions from one side to the other.

13. Apparatus according to claim 12 wherein a bracket pivotally supported outside the chamber with a portion extending into the chamber pivotally supports the sensor and wherein there is a hydraulically-actuated transducer outside the chamber in engagement with the bracket at the opposite side of the pivot axis from the sensor plate which holds the sensor plate at an angle of approximately 45 degrees to the horizontal.

14. Apparatus according to claim 11 wherein the conveyor is an endless means supported with one run parallel to the bottom of the hopper at the inside, said hopper being provided with an opening through which the run enters and an opening through which the run leaves and a doctor blade mounted at the opening through which endless means leaves controlling the thickness of the material on the surface of the belt.

15. Apparatus according to claim 14 wherein said endless means is comprised of spaced parallel slats.

16. Apparatus according to claim 11 wherein the means operable by the sensor plate is a hydraulically distended plunger protruding from a fixed hydraulic cylinder.

17. Apparatus according to claim 16 wherein the position of engagement of the plunger with the bracket is adjustable relative to the pivot axis.

18. Apparatus according to claim 11 wherein the conveyor is an auger.

19. Apparatus for controlling delivery of material from a hopper to a distributor comprising means for delivering material from the hopper to a flow path for gravitational delivery to the distributor means including an inclined support surface situated in said flow path which measures only the dead weight of the gravitationally flowing mass on said support surface for producing a signal substantially proportional only to the mass of material flowing on said support surface and hence the rate of mass flow at any given instant, said signal being produced in a manner which is substantially independent of impact forces of said material on said sensing means, and means operable by said signal to change the rate at which the means for delivering the material delivers material to maintain a predetermined selected flow of material along said flow path.

20. The method of distributing material in an uniformly thick layer comprising gravitationally depositing the material onto the surface of a motor-driven conveyor, receiving the material from the discharge end of the conveyor and applying it on a downwardly inclined plate such that it slides gravitationally downwardly thereon onto a distributor, sensing only the dead weight of the mass flowing on the downwardly inclined plate and hence the rate of mass flow at any given instant substantially independent of the impact forces of said material received on said downwardly inclined plate and sending a signal proportional to said dead weight to the motor-driven conveyor to change its speed in a manner to maintain a controlled rate of mass flow of material.

21. The method according to claim 20 wherein sensing of the dead weight comprises the steps of pivotally supporting the downwardly inclined plate at a predetermined angle, receiving the material at substantially the pivot axis and sensing the displacement force of the inclined plate about said axis.

22. The method of distributing the material in a uniformly thick layer comprising gravitationally depositing the material onto the surface of a motor-driven conveyor, receiving the material from the discharge end of the conveyor onto a first fixed downwardly inclined plate along which it slides, depositing material from said first plate on a second pivoted downwardly inclined plate substantially at the pivot axis, passing said material by sliding along said second plate to be discharged from the lower end thereof onto a distributor, sensing the displacement force of said second plate relative to its pivot axis due substantially only to the dead weight of the mass sliding downwardly thereon and sending a signal which is proportional to the sensed displacement force on said second plate to the motor driven conveyor to change the speed thereof in a manner to maintain a constant mass of material on the downwardly inclined second plate.

23. The method of distributing a constant mass of material from a moving vehicle comprising, while the vehicle is moving, gravitationally depositing a mass of material to be distributed onto a motor-driven conveyor mounted on the vehicle, receiving the material from the discharge end of the conveyor on a downwardly inclined plate also mounted on the vehicle such that it slides downwardly thereon onto a distributor mounted on the vehicle, sensing the weight of the mass on the downwardly inclined plate as it slides downwardly thereon, sensing the speed of the vehicle, combining said signals and sending the resulting signal to the motor-driven conveyor to change the speed of the conveyor in a manner to maintain a selected rate of mass flow on the downwardly inclined plate regardless of the speed of the vehicle.

24. A method according to claim 23 comprising using a closed loop feedback control system and of using the sensing signals to close the loop.

25. Apparatus for controlling the delivery of material from a vehicle at a rate proportional to the ground speed of the vehicle to thus maintain a constant mass per unit area comprising a distributor, a conveyor for delivering the material to the distributor, means situated between the conveyor and distributor for measuring the rate of mass flow of material delivered by the conveyor to the distributor and producing a signal proportional thereto, said means comprising an inclined deflector plate supported adjacent the conveyor with is upper end at the delivery end of the conveyor, an inclined sensing plate supported in an inclined position adjacent the lower end of the deflector plate in a position such that the lower end of the deflector plate gravitationally delivers material onto the sensing plate, a sensor comprising servo means operable to produce a signal proportional to the mass of material sliding downwardly on said sensing plate to the distributor, means for producing a signal proportional to the ground speed of the vehicle, means for comparing the two signals and means responsive to the output of said last means for changing the speed of the conveyor so as to compensate for changes in the ground speed of the vehicle.

26. Apparatus according to claim 25 wherein said sensor comprises resistance means.

27. Apparatus according to claim 25 wherein said sensor comprises a Bourdon gauge.

28. Apparatus for monitoring the flow of particulate flowable material as it is delivered to a receiving station comprising a supporting structure embodying a container of bulk particulate flowable material, means for delivering said particulate material from the container to flow by gravity through a flow path to said receiving station, sensing means interposed in said flow path, said sensing means having an inclined support surface situated in said flow path of said particulate material over which said particulate material slides by gravity flow for sensing a quantity substantially representative of the mass of said material sliding on said support surface and hence the rate of mass flow along said path at any given instant, said sensing means being responsive to measure variable flow rates and substantially insensitive to impact forces due to said flow, and utilization means for the sensed quantity representing the rate of mass flow.

29. Apparatus according to claim 28 wherein said sensing means comprises an inclined deflector plate supported adjacent the delivery means, an inclined sensing plate supported on a pivot axis in an inclined position adjacent the lower end of said deflector plate in a position such that the lower end of the deflector plate gravitationally delivers material onto the sensing plate adjacent the said pivot axis thereof, and sensing means operable to produce a signal proportional to the mass of material sliding downwardly on said sensing plate.

30. Apparatus according to claim 29 wherein said sensing plate is inclined in a direction opposite to the direction of inclination of said deflector plate.

31. Apparatus according to claim 30 wherein said deflector plate and sensing plate are inclined at opposite angles of approximately 45° to the horizontal.

* * * * *